United States Patent
Kikuchi (10) Patent No.: US 6,496,788 B1
(45) Date of Patent: Dec. 17, 2002

(54) DATA PROCESSING METHOD AND APPARATUS TO DETERMINE KILLER RATIO BASED ON A VARIETY OF DEFECT TYPES

(75) Inventor: Hiroaki Kikuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/544,284

(22) Filed: Apr. 6, 2000

(30) Foreign Application Priority Data

Apr. 14, 1999 (JP) .......................................... 11-106768

(51) Int. Cl.⁷ .......................... G06F 17/18; H01L 21/66
(52) U.S. Cl. .......................... 702/181; 702/183; 438/14
(58) Field of Search .......................... 438/14; 324/765; 700/121; 702/179, 180, 181, 182, 183

(56) References Cited

U.S. PATENT DOCUMENTS 5,917,332 A * 6/1999 Chen et al. .................. 324/765

6,016,562 A * 1/2000 Miyazaki et al. ........ 356/237.1
6,185,707 B1 * 2/2001 Smith et al. ................. 382/145
6,338,001 B1 * 1/2002 Steffan et al. ................. 431/14

FOREIGN PATENT DOCUMENTS

JP          11-264797          9/1999

* cited by examiner

*Primary Examiner*—Michael Sherry
*Assistant Examiner*—Evan Pert
(74) *Attorney, Agent, or Firm*—Sughrue Mion, PLLC

(57) ABSTRACT

When a killer ratio resulting from a specified defect is calculated from die research data including the number of defects and manufacturing result pass/fail for each of a plurality of dies, the die research data is classified based on the number of the specified defects present on a die to calculate a killer ratio for each of a plurality of the classified groups, from which a killer ratio in the case of one specified defect is calculated for each of the groups. The killer ratio for each of the groups is weighted in accordance with the number of the specified defects to calculate one killer ratio as the average value of the weighted killer ratios, thereby calculating one killer ratio which reflects the effect of the number of the specified defects present on a die.

20 Claims, 6 Drawing Sheets

FIG. 1A
PRIOR ART

● :SPECIFIED DEFECT

▨ :UNFAVORABLE

FIG. 1B
PRIOR ART

SPECIFIED DEFECT ABSENT AND MANUFACTURING RESULT FAVORABLE

SPECIFIED DEFECT PRESENT AND MANUFACTURING RESULT FAVORABLE

SPECIFIED DEFECT ABSENT AND MANUFACTURING RESULT UNFAVORABLE

SPECIFIED DEFECT PRESENT AND MANUFACTURING RESULT UNFAVORABLE

● : SPECIFIED DEFECT

▨ : UNFAVORABLE

FIG. 4B

| | ONE SPECIFIED DEFECT PRESENT AND MANUFACTURING RESULT FAVORABLE | TWO SPECIFIED DEFECTS PRESENT AND MANUFACTURING RESULT FAVORABLE | THREE SPECIFIED DEFECTS PRESENT AND MANUFACTURING RESULT FAVORABLE |
|---|---|---|---|
| SPECIFIED DEFECT ABSENT AND MANFACTURING RESULT FAVORABLE | | | |
| SPECIFIED DEFECT ABSENT AND MANFACTURING RESULT UNFAVORABLE | ONE SPECIFIED DEFECT PRESENT AND MANUFACTURING RESULT UNFAVORABLE | TWO SPECIFIED DEFECTS PRESENT AND MANUFACTURING RESULT UNFAVORABLE | THREE SPECIFIED DEFECTS PRESENT AND MANUFACTURING RESULT UNFAVORABLE |

|  | KILLER RATIO | NUMBER OF UNFAVORABLE CHIPS RESULTING FROM THE SPECIFIED DEFECT | NUMBER OF CRITICAL SPECIFIED DEFECTS |
|---|---|---|---|
| MODEL DATA | 0.4 | 34 | 40 |
| CONVENTIONAL METHOD | 0.483 | 30.4 | 48.3 |
| THIS INVENTION METHOD | 0.413 | 31.9 | 41.3 |

FIG. 7

|  | KILLER RATIO | NUMBER OF PREDICTED UNFAVORABLE CHIPS RESULTING FROM THE SPECIFIED DEFECT | NUMBER OF PREDICTED CRITICAL SPECIFIED DEFECTS |
|---|---|---|---|
| MODEL DATA | 0.4 | 8 | 8 |
| CONVENTIONAL METHOD | 0.483 | 9.2 | 9.7 |
| THIS INVENTION METHOD | 0.413 | 8.1 | 8.3 |

DATA PROCESSING METHOD AND APPARATUS TO DETERMINE KILLER RATIO BASED ON A VARIETY OF DEFECT TYPES

BACKGROUND OF THE INVENTION

1. Field of the Invention

The present invention relates to a data processing method and apparatus for calculating a killer ratio resulting from a specified defect, and an information storage medium for storing programs as software which cause a computer to execute various processing operations.

2. Description of the Related Art

Currently, IC (Integrated Circuit) chips are generally mass-produced by dividing a single semiconductor wafer into a plurality of dies and then manufacturing integrated circuits of the same structure on the respective dies. Various approaches for improving the yields of such mass-produced IC chips are also studied, and for example, the calculation of a killer ratio is performed based on past die research data and yield data.

The killer ratio refers to an expected value of the probability that, when a defect of one type is specified, the specified defect present on a die results in a defective IC chip manufactured from the die. For example, when one die and a defect of one type are specified, the specified defect present on the specified die does not necessarily cause the specified die to be defective. Also, even when the specified defect is not present on the specified die, the specified die may become defective due to another type of defect.

The die research data includes, for example, defect presence/absence data for indicating the presence or absence of defects for each type and result pass/fail data for indicating whether a manufacturing result is favorable or unfavorable, for each die identification data which identifies a plurality of dies. The die research data is registered for each of a plurality of manufacturing steps which are performed on a single wafer.

The aforementioned defect presence/absence data is collected from a plurality of dies for each of a plurality of manufacturing steps when a semiconductor wafer is divided into a plurality of dies to mass-produce a plurality of IC chips through various manufacturing steps, while the result pass/fail data is collected by performing a final test of each of a plurality of finished IC chips.

It should be noted that while a plurality of sets of die research data in a single manufacturing step of a single semiconductor wafer are herein referred as an example as mentioned above for simplifying description, a number of sets of die research data for a plurality of manufacturing steps of a single semiconductor wafer are generally collected and accumulated corresponding to a plurality of semiconductor wafers of a lot, and a number of sets of die research data for each lot is collected and accumulated corresponding to a plurality of lots.

Figure 1A:
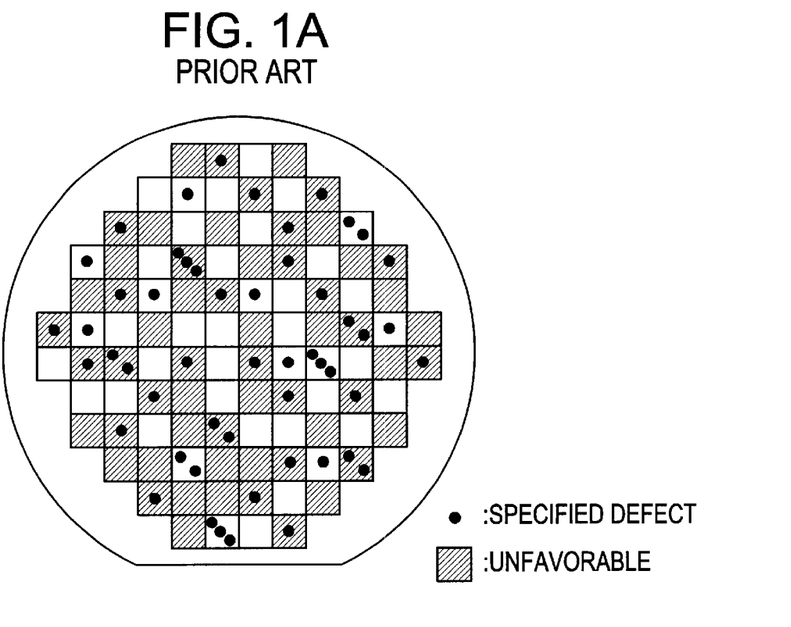
FIG. 1(a) is a schematic plan view showing a relationship between dies and specified defects in a semiconductor wafer and FIG. 1(b) is a schematic diagram showing dies of a single semiconductor wafer classified into four states.
Figure 1B:
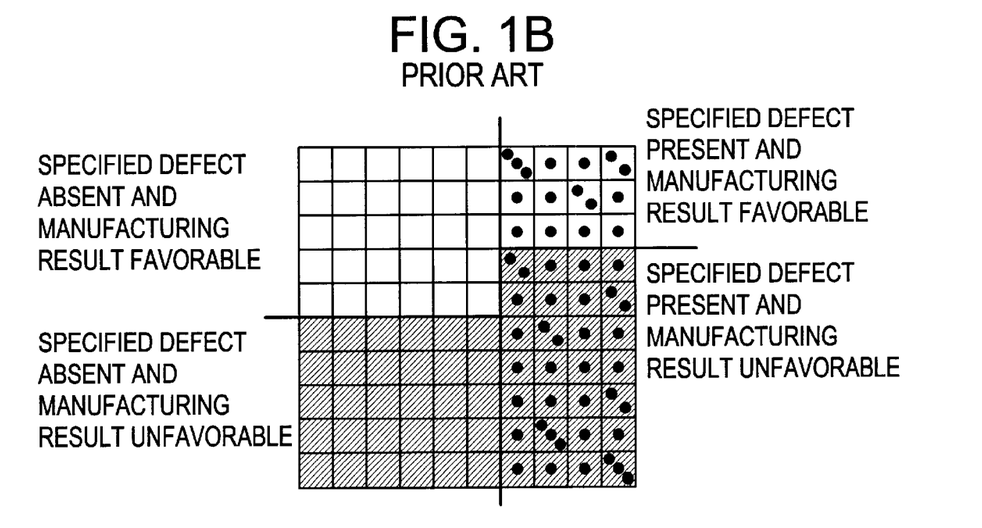

As shown in FIG. 1(a), when a defect of one type is specified, die research data of a plurality of dies from a single semiconductor wafer is classified into four: "specified defect present and manufacturing result favorable"; "specified defect present and manufacturing result unfavorable"; "specified defect absent and manufacturing result favorable"; and "specified defect absent and manufacturing result unfavorable", as shown in FIG. 1(b).

In this case, assuming that the total number of dies with the specified defect present thereon is T', and the number of dies with the specified defect present thereon and a favorable manufacturing result is $T_G{}'$, then a killer ratio KR is given by:

$$KR=\text{(the number of dies with the specified defect and an unfavorable manufacturing result)/(the total number of dies with the specified defect)}=1-\text{(the number of dies with the specified defect and a favorable manufacturing result)/(the total number of dies with the specified defect)}=1-T_G{}'/T' \quad (1)$$

The calculation of the killer ratio with one of a plurality of types of defects being specified as mentioned above can predict the ratio at which a finished IC chip manufactured from a die becomes defective when the specified defect is present on the die. However, the aforementioned calculation method of the killer ratio does not consider a defective IC chip due to unspecified defects, resulting in unsatisfactory calculation accuracy of the killer ratio.

Thus, a calculation method has been proposed for improving the accuracy of the killer ratio by considering the effects of unspecified defects. The method assumes that all types of defects are randomly distributed over the entire region of a semiconductor wafer and a die has the specified defect and another kind of defect mixed thereon.

A survival rate (a ratio at which its manufacturing result is favorable) is detected for dies with no specified defect and is used as "a baseline yield" which is a survival rate of unspecified defects. Assuming that the total number of dies is T and the number of dies with a favorable manufacturing result is $T_G$, then the baseline yield Yb is given by:

$$Yb=(T_G-T_G{}')/(T-T') \quad (2)$$

When the aforementioned equation (1) is corrected by the above equation (2), the effects of types of defects other can be eliminated from the killer ratio of dies with the specified defect. The killer ratio $KR_M$ in this case is given by:

$$KR_M=1-(T_G-T')/Yb=1-[T_G{}'(T-T')]/[T'(T_G-T_G{}')] \quad (3)$$

The aforementioned calculation method of the killer ratio resulting from a specified defect has satisfactory accuracy since it can eliminate the effects of unspecified other kinds of defects. However, even with the aforementioned calculation method of the killer ratio, the number of the specified defects present on a single die is not taken into account, thereby reducing the accuracy of the killer ratio calculation due to differences in the number.

SUMMARY OF THE INVENTION

The present invention has been made in view of the aforementioned problems, and it is an object thereof to provide a data processing method and apparatus capable of calculating a killer ratio with more satisfactory accuracy than that in the prior art, and an information storage medium for storing programs as software which cause a computer to execute processing operations of the data processing method of the present invention.

According to a first aspect of the present invention, the data processing apparatus comprises data storing means for previously registering die research data which includes at least the number of defects for each type and manufacturing result pass/fail for each of a plurality of dies divided from a single wafer, data input means for receiving type selecting data for selecting a specified defect which is a defect of one type, data retrieving means for retrieving the die research data corresponding to the specified defect from the data storing means with the type selecting data input to the data input means, data classifying means for classifying the die research data retrieved by the data retrieving means based on the number of the specified defects present on a die, and first calculating means for calculating a killer ratio for each of a plurality of groups of die research data classified by the data classifying means.

Therefore, in the data processing method with the data processing apparatus of the present invention, the die research data including at least the number of defects for each type and manufacturing result pass/fail for each of a plurality of dies divided from a single wafer is previously registered in the data storing means. In such a state, when the type selecting data for selecting a specified defect which is a defect of one type is input to the data input means, the data retrieving means retrieves the die research data corresponding to the specified defect from the data storing means with the input type selecting data. The data classifying means classifies the retrieved die research data based on the number of the specified defects present on a die, and the first calculating means calculates the killer ratio for each of a plurality of groups of the classified die research data. The killer ratios for the plurality of groups thus calculated are provided for the respective groups classified based on the number of the specified defects present on a die.

The data processing apparatus as described above may comprise second calculating means for calculating a killer ratio in the case of one specified defect for each of the groups from the killer ratio for each of the groups calculated by the first calculating means. In this case, since the second calculating means calculates a killer ratio in the case of one specified defect for each of the groups from the killer ratio for each of the groups calculated by the first calculating means, a killer ratio when a plurality of specified defects present on a die are assumed to be one is calculated.

The data processing apparatus as described above may comprise third calculating means for calculating one killer ratio as the average value of the killer ratios for the groups calculated by the second calculating means. In this case, since the third calculating means calculates one killer ratio as the average value of the killer ratios for the groups calculated by the second calculating means, one killer ratio which reflects the effect of the number of the specified defects present on a die is calculated.

In the data processing apparatus as described above, the third calculating means may weight the killer ratio for each of the groups in accordance with the number of the specified defects when it calculates the one killer ratio as the average value. In this case, since the third calculating means calculates one killer ratio by weighting the killer ratio for each of the groups in accordance with the number of the specified defects, the effect of the number of the specified defects present on a die is appropriately reflected in the calculation result of the killer ratio.

In the data processing apparatus as described above, the third calculating means may assign a heavier weight to a killer ratio in a group with a larger number of the specified defects. In this case, since the third calculating means assigns a heavier weight to a killer ratio in a group with a larger number of the specified defects, the effect of the number of the specified defects present on a die is more appropriately reflected in the calculation result of the killer ratio.

In the data processing apparatus as described above, the third calculating means may weight the killer ratio in accordance with the ratio of the total number of the specified defects present on a single wafer to the total number of the specified defects for each of the groups. In this case, the third calculating means weights the killer ratio in accordance with the ratio of the total number of the specified defects present on a single wafer to the total number of the specified defects for each of the groups, the effect of the number of the specified defects present on a die is more appropriately reflected in the calculation result of the killer ratio.

The data processing apparatus as described above may comprise data extracting means for extracting dies with no specified defect from the die research data retrieved by the data retrieving means, correction generating means for generating corrected data which reflects the effects of types of defects other than the specified defect from the die research data extracted by the data extracting means, and result correcting means for correcting the killer ratio with the corrected data generated by the correction generating means.

In this case, the data extracting means extracts die with no specified defect from the die research data retrieved by the data retrieving means, and the correction generating means generates corrected data which reflects the effects of types of defects other than the specified defect from the extracted die research data. The result correcting means corrects the killer ratio with the generated corrected data, thereby eliminating the effects of kinds of defects other than the specified defect from the killer ratio which reflects the effect of the number of the specified defects present on a die.

According to a second aspect of the present invention, the data processing apparatus comprises data storing means for previously registering die research data which includes at least the number of defects for each type and manufacturing result pass/fail for each of a plurality of dies divided from a single wafer, data input means for receiving type selecting data for selecting a specified defect which is a defect of one type, data retrieving means for retrieving the die research data corresponding to the specified defect from the data storing means with the type selecting data input to the data input means, data classifying means for classifying the die research data retrieved by the data retrieving means based on the number of the specified defects present on a die, and killer ratio calculating means for detecting, from a plurality of groups of the die research data classified by the data classifying means, the number of dies $T_i$ with i specified defects, the number of dies $T_{Gi}$ with i specified defects and a favorable manufacturing result, and the total number of specified defects N' present in the wafer, and calculating a killer ratio KR' resulting from the specified defect as follows;

$$KR'=\Sigma(T_i \cdot i/N')\{1-[T_{Gi}/T_i]^{1/i}\}$$

Therefore, in the data processing method with the data processing apparatus of the present invention, the die research data including at least the number of defects for each type and manufacturing result pass/fail for each of a plurality of dies divided from a single wafer is previously registered in the data storing means. In such a state, when the type selecting data for selecting a specified defect which is a defect of one type is input to the data input means, the data retrieving means retrieves the die research data corresponding to the specified defect from the data storing means with the input type selecting data. The killer ratio calculating means detects, from the retrieved die research data, the number of dies $T_i$ with i specified defects, the number of dies $T_{Gi}$ with i specified defects and a favorable manufacturing result, and the total number of specified defects N' present in the wafer, and calculates a killer ratio KR' resulting from the specified defect as $KR'=\Sigma(T_i \cdot i/N')\{1-[T_{Gi}/T_i]^{1/i}\}$. Thus, one killer ratio which reflects the effect of the number of the specified defects present on a die is calculated.

According to a third aspect of the present invention, the data processing apparatus comprises data storing means for previously registering die research data which includes at least the number of defects for each type and manufacturing result pass/fail for each of a plurality of dies divided from a single wafer, data input means for receiving type selecting data for selecting a specified defect which is a defect of one type, data retrieving means for retrieving the die research data corresponding to the specified defect from the data storing means with the type selecting data input to the data input means, data classifying means for classifying the die research data retrieved by the data retrieving means based on the number of the specified defects present on a die, and killer ratio calculating means for detecting, from a plurality of groups of the die research data classified by the data classifying means, the total number of dies T present in the wafer, the number of dies T' with the specified defect, the number of dies $T_G$ with a favorable manufacturing result, the number of dies $T_G'$ with the specified defect and a favorable manufacturing result, the number of dies $T_i$ with i specified defects, the number of dies $T_{Gi}$ with i specified defects and a favorable manufacturing result, and the total number of specified defects N' present in the wafer, and calculating a killer ratio $KR_1'$ resulting from the specified defect as follows:

$$KR_1'=\Sigma(T_i \cdot i/N')\{1-[(T_{Gi}(T-T'))/(T_i(T_G-T_G'))]^{1/i}\}$$

Therefore, in the data processing method with the data processing apparatus of the present invention, the die research data including at least the number of defects for each type and manufacturing result pass/fail for each of a plurality of dies divided from a single wafer is previously registered in the data storing means. In such a state, when the type selecting data for selecting a specified defect which is a defect of one type is input to the data input means, the data retrieving means retrieves the die research data corresponding to the specified defect from the data storing means with the input type selecting data. The killer ratio calculating means detects, from the retrieved die research data, the total number of dies T present in the wafer, the number of dies T' with the specified defect, the number of dies $T_G$ with a favorable manufacturing result, the number of dies $T_G'$ with the specified defect and a favorable manufacturing result, the number of dies $T_i$ with i specified defects, the number of dies $T_{Gi}$ with i specified defects and a favorable manufacturing result, and the total number of specified defects N' present in the wafer, and calculates a killer ratio $KR_1'$ resulting from the specified defect as $KR_1'=\Sigma(T_i \cdot i/N')\{1-[(T_{Gi}(T-T'))/(T_i(T_G-T_G'))]^{1/i}\}$. Thus, one killer ratio which reflects the effect of the number of the specified defects present on a die is calculated with the effects of kinds of defects other than the specified defect being eliminated.

It should be noted that various means in the present invention may be any which is formed to realize their functions, and allow dedicated hardware for generating a predetermined function, a computer provided with a predetermined function by means of programs, a predetermined function realized in the computer with programs, a combination thereof, or the like.

For example, the data storing means may be any which stores various registered data, and allows a storage area of an information storage means such as RAM (Random Access Memory), for example. The data input means may be any which receives various data input thereto, and allows a keyboard which receives data input through manual operations, a communication I/F (Interface) which receives data input through signal reception, and a drive device which retrieves recorded data from an information storage medium such as FD (Floppy Disc), CD (Compact Disc)-ROM (Read Only Memory) or the like.

According to a first aspect of the present invention, the information storage medium stores software readable by a computer as programs which causes the computer to execute: storing die research data including at least the number of defects for each type and manufacturing result pass/fail for each of a plurality of dies divided from a single wafer; receiving type selecting data for selecting a specified defect which is a defect of one type; retrieving the die research data corresponding to the specified defect with the input type selecting data; classifying the retrieved die research data based on the number of the specified defects present on a die; calculating a killer ratio for each of a plurality of groups of the classified die research data; calculating a killer ratio in the case of one specified defect for each of the groups from the calculated killer ratio for each of the groups; weighting the calculated killer ratio for each of the groups in accordance with the number of the specified defects; and calculating one killer ratio as the average value of the weighted killer ratios for the groups.

Therefore, when a computer reads the programs stored in the information storage medium of the present invention to perform corresponding processing operations, the computer stores die research data including at least the number of defects for each type and manufacturing result pass/fail for each of a plurality of dies divided from a single wafer, and, in this state, receives input type selecting data for selecting a specified defect which is a defect of one type. The die research data corresponding to the specified defect is retrieved with the input type selecting data, and the retrieved die research data is classified based on the number of the specified defects present on a die. A killer ratio is calculated for each of a plurality of groups of the classified die research data, and a killer ratio in the case of one specified defect is calculated for each of the groups from the calculated killer ratio for each of the groups. The calculated killer ratio for each of the groups is weighted in accordance with the number of the specified defects, and one killer ratio is calculated as the average value of the weighted killer ratios for the groups, thereby calculating one killer ratio which reflects the effect of the number of the specified defects present on a die.

According to a second aspect of the present invention, the information storage medium stores software readable by a computer as programs which causes the computer to execute: storing die research data including at least the number of defects for each type and manufacturing result pass/fail for each of a plurality of dies divided from a single wafer; receiving type selecting data for selecting a specified defect which is a defect of one type; retrieving the die research data corresponding to the specified defect with the input type selecting data; classifying the retrieved die research data based on the number of the specified defects present on a die; detecting, from the classified die research data, the number of dies $T_i$ with i specified defects, the number of dies $T_{Gi}$ with i specified defects and a favorable manufacturing result, and the total number of specified defects N' present in the wafer; and calculating a killer ratio KR' resulting from the specified defect as $KR'=\Sigma(T_i \cdot i/N')\{1-[T_{Gi}/T_i]^{1/i}\}$.

Therefore, when a computer reads the programs stored in the information storage medium of the present invention to perform corresponding processing operations, the computer stores die research data including at least the number of defects for each type and manufacturing result pass/fail for each of a plurality of dies divided from a single wafer, and, in this state, receives input type selecting data for selecting a specified defect which is a defect of one type. The die research data corresponding to the specified defect is retrieved with the input type selecting data, and the retrieved die research data is classified based on the number of the specified defects present on a die. From the classified die research data, the number of dies $T_i$ with i specified defects, the number of dies $T_{Gi}$ with i specified defects and a favorable manufacturing result, and the total number of specified defects N' present in the wafer are detected, and a killer ratio KR' resulting from the specified defect is calculated as $KR'=\Sigma(T_i \cdot i/N')\{1-[T_{Gi}/T_i]^{1/i}\}$. Thus, one killer ratio which reflects the effect of the number of the specified defects present on a die is calculated.

According to a third aspect of the present invention, the information storage medium stores software readable by a computer as programs which causes the computer to execute: storing die research data including at least the number of defects for each type and manufacturing result pass/fail for each of a plurality of dies divided from a single wafer; receiving type selecting data for selecting a specified defect which is a defect of one type; retrieving the die research data corresponding to the specified defect with the input type selecting data; classifying the retrieved die research data based on the number of the specified defects present on a die; detecting, from the classified die research data, total number of dies T present in the wafer, the number of dies T' with the specified defect, the number of dies $T_G$ with a favorable manufacturing result, the number of dies $T_G'$ with the specified defect and a favorable manufacturing result, the number of dies $T_i$ with i specified defects, the number of dies $T_{Gi}$ with i specified defects and a favorable manufacturing result, and the total number of specified defects N' present in the wafer; and calculating a killer ratio $KR_1'$ resulting from the specified defect as $KR_1'=\Sigma(T_i \cdot i/N')\{1-[(T_{Gi}(T-T'))/(T_i(T_G-T_G'))]^{1/i}\}$.

Therefore, when a computer reads the programs stored in the information storage medium of the present invention to perform corresponding processing operations, the computer stores die research data including at least the number of defects for each type and manufacturing result pass/fail for each of a plurality of dies divided from a single wafer, and, in this state, receives input type selecting data for selecting a specified defect which is a defect of one type. The die research data corresponding to the specified defect is retrieved with the input type selecting data, and the retrieved die research data is classified based on the number of the specified defects present on a die. From the classified die research data, the total number of dies T present in the wafer, the number of dies T' with the specified defect, the number of dies $T_G$ with a favorable manufacturing result, the number of dies $T_G'$ with the specified defect and a favorable manufacturing result, the number of dies $T_i$ with i specified defects, the number of dies $T_{Gi}$ with i specified defects and a favorable manufacturing result, and the total number of specified defects N' present in the wafer are detected, and a killer ratio $KR_1'$ resulting from the specified defect is calculated as $KR_1'=\Sigma(T_i \cdot i/N')\{1-[(T_{Gi}(T-T'))/(T_i(T_G-T_G'))]^{1/i}\}$. Thus, one killer ratio which reflects the effect of the number of the specified defects present on a die is calculated with the effects of kinds of defects other than the specified defect being eliminated.

It should be noted that the information storage medium in the present invention may be any which previously stores programs for causing the computer to execute various processing as software, and, for example, an ROM or HDD (Hard Disc Drive) fixed in an apparatus having a computer as a part thereof, and CD (Compact Disc)-ROM (Read Only Memory) or FD which is removably loaded in an apparatus having a computer as a part thereof are allowed.

The computer in the present invention may be any which can read programs comprising software to execute corresponding processing operations, and for example, an apparatus having a CPU (Central Processing Unit) as a main portion to which various devices such as ROMs, RAMs or I/Fs are connected as required is allowed.

The execution of various operations by the computer corresponding to software in the present invention contemplates that the computer controls the operations of various devices. For example, the data storage by the computer contemplates that the computer stores various data in an information storage medium such as RAM previously connected thereto, that the computer stores various data in an internal memory included therein, or that the computer stores various data in an FD when the FD is used as the information storage medium in the present invention.

DETAILED DESCRIPTION OF THE PREFERRED EMBODIMENTS

Figure 2:
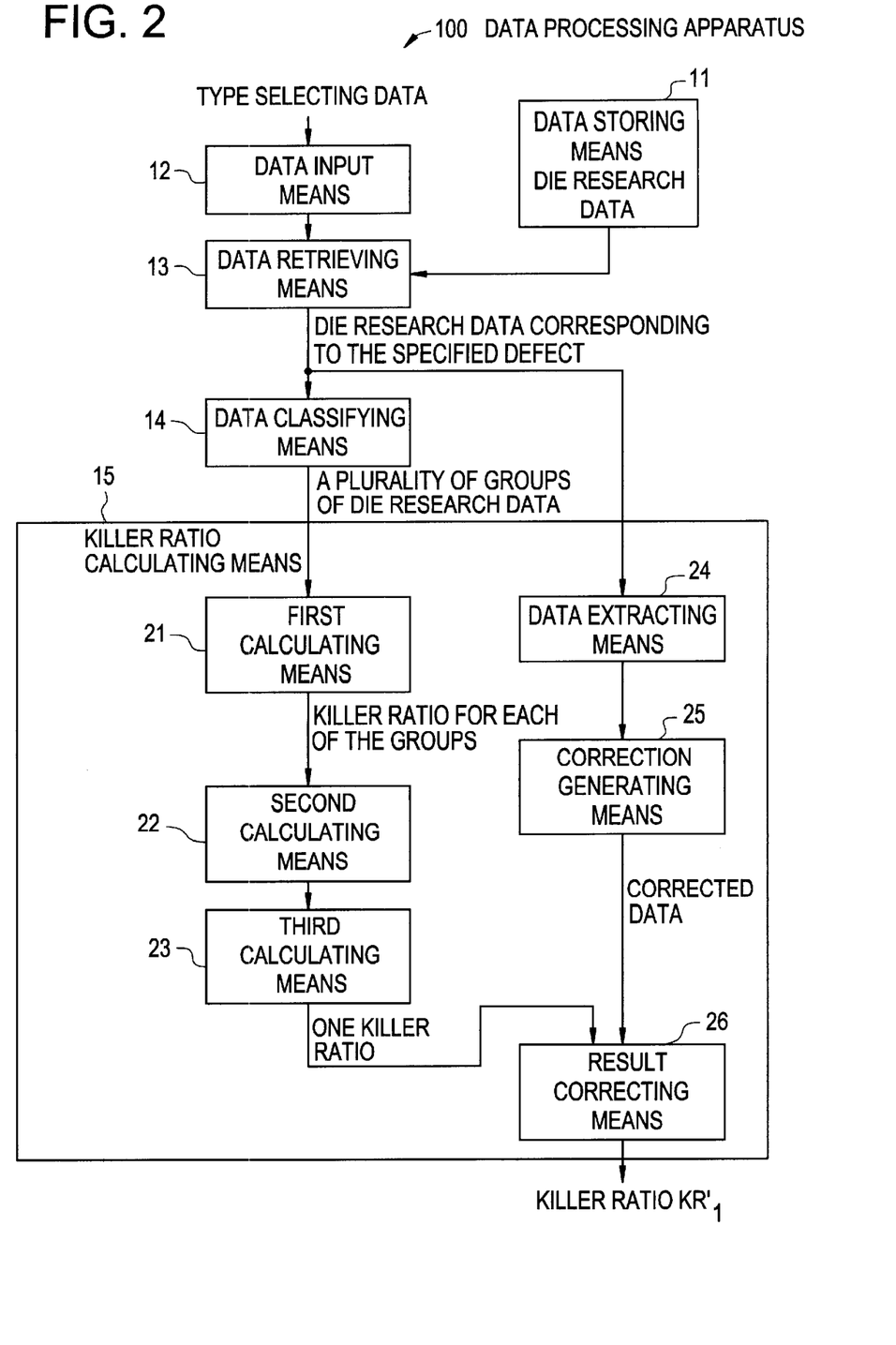
FIG. 2 is a schematic diagram showing a logical structure of a data processing apparatus serving as a data processing apparatus of an embodiment of the present invention.
Figure 4A:
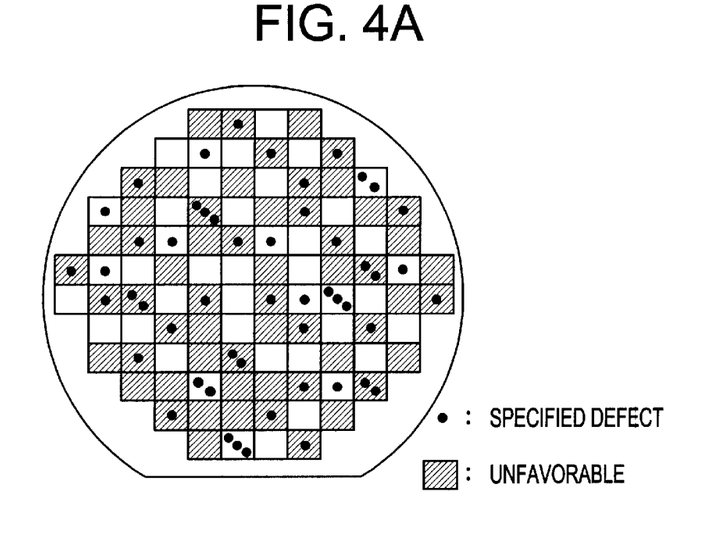
FIG. 4(a) is a schematic plan view showing a relationship between dies and specified defects in a semiconductor wafer and FIG. 4(b) is a schematic diagram showing dies of a single semiconductor wafer classified based on the number of the specified defects.
Figure 4B:
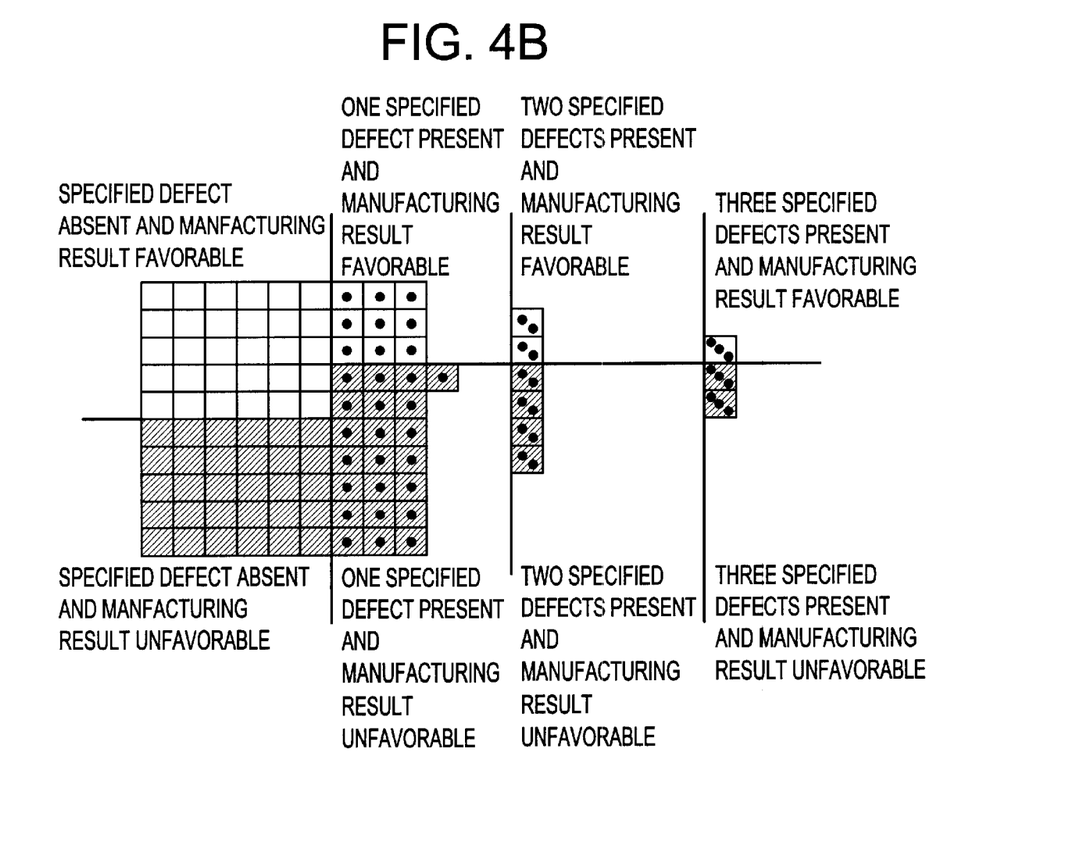
Figure 5:
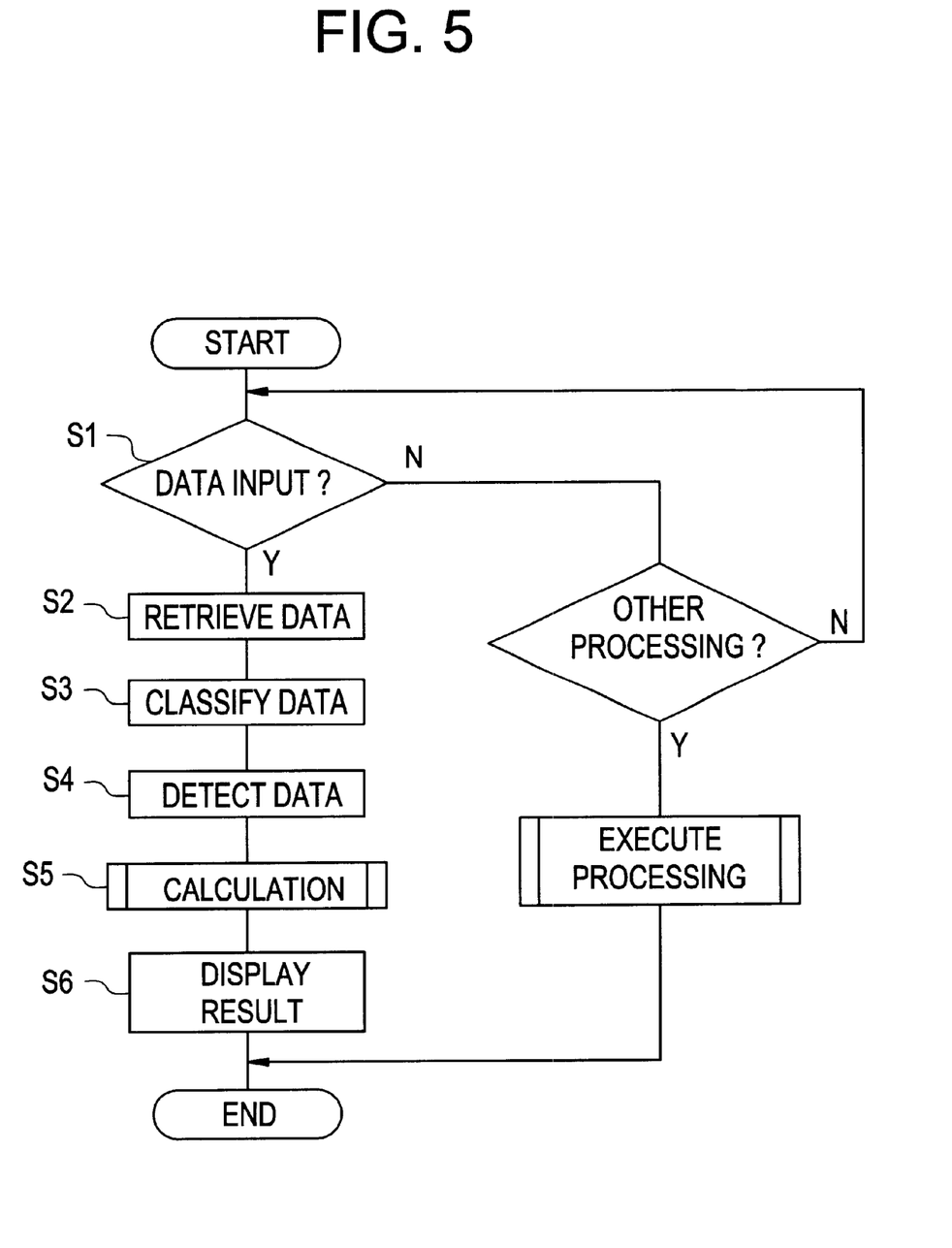
FIG. 5 is a flow chart showing a data processing method with the data processing apparatus of the embodiment.

An embodiment of the present invention will be hereinafter described with reference to FIGS. 2 to 5. FIG. 2 is a schematic diagram showing a logical structure of a data processing apparatus of the embodiment, FIG. 3 is a block diagram showing a physical structure thereof, FIG. 4(a) is a schematic plan view showing a relationship between dies and specified defects in a semiconductor wafer, FIG. 4(b) is a schematic diagram showing dies of a single semiconductor wafer classified based on the number of the specified defects, and FIG. 5 is a flow chart showing a data processing method with the data processing apparatus of the embodiment.

Figure 3:
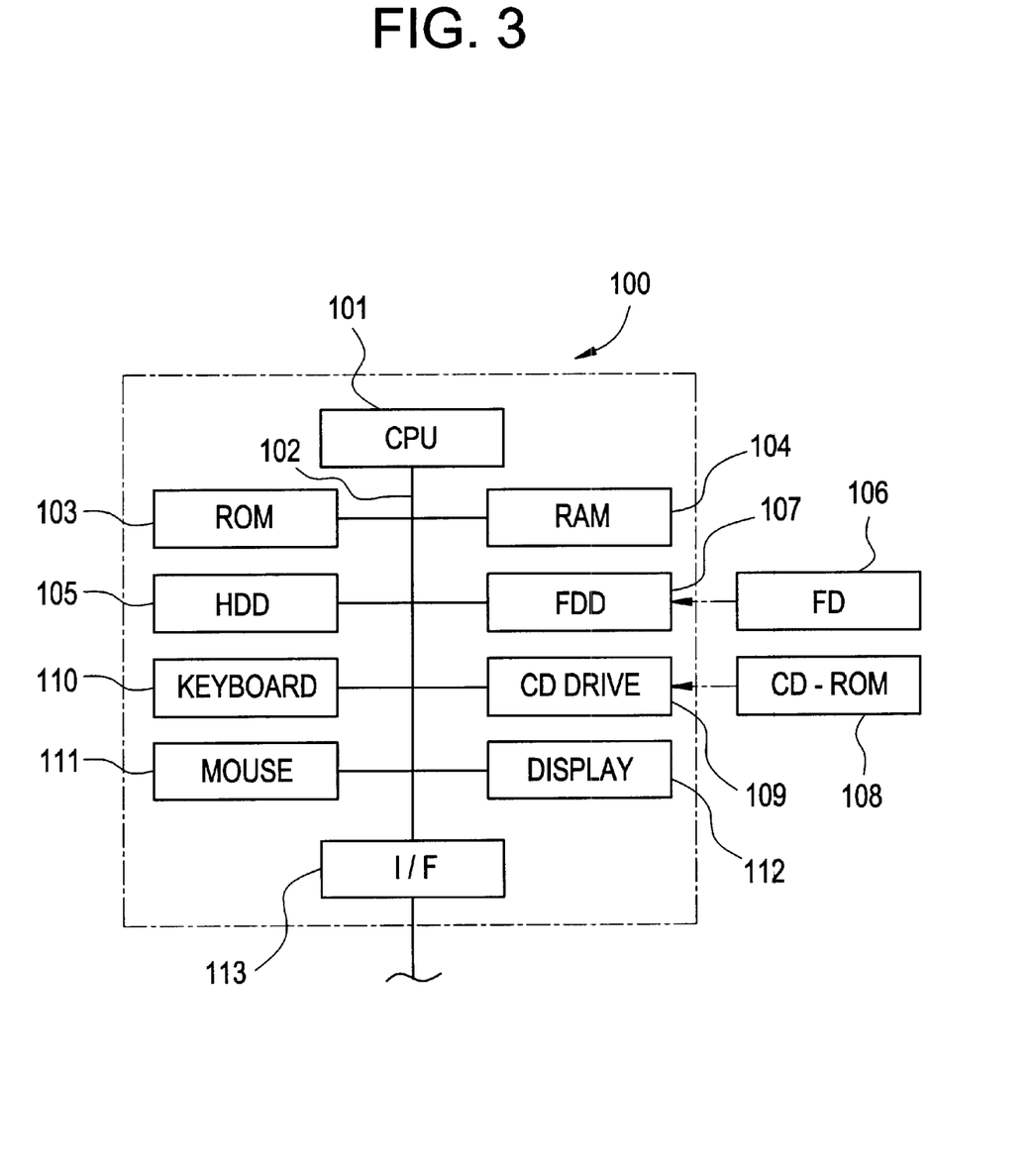
FIG. 3 is a block diagram showing a physical structure of the data processing apparatus.

Data processing apparatus 100 of the embodiment comprises a so-called personal computer, and comprises CPU 101 as hardware serving as a main portion of the computer as shown in FIG. 3. CPU 101 is connected through bus line 102 to hardware such as ROM 103, RAM 104, HDD 105, FDD (FD Drive) 107 to be loaded with FD 106, CD drive 109 to be loaded with CD-ROM 108, keyboard 110, mouse 111, display 112, communication I/F 113.

In data processing apparatus 100 of the embodiment, hardware such ROM 103, RAM 104, HDD 105, FD 106, and CD-ROM 108 correspond to information storage media in which programs and data required for various operations are stored as software.

For example, control programs for causing CPU 101 to execute various processing operations are previously stored in FD 106 or CD-ROM 108. Such software is previously installed in HDD 105, and copied to RAM 104 and read by CPU 101 at the start-up of data processing apparatus 100.

In this manner, CPU 101 reads proper programs to execute various processing operations, thereby logically realizing various means such as data storing means 11, data input means 12, data retrieving means 13, data classifying means 14, killer ratio calculating means 15 as various functions in data processing apparatus 100 of the embodiment, as shown in FIG. 2.

Data storing means 11 corresponds to a predetermined storage area in an information storage medium such as HDD 105 recognized by CPU 101, and previously stores a number sets of die research data. This die research data-includes at least the number of defects for each type and manufacturing result pass/fail for each of a plurality of die divided from a single semiconductor wafer, and actually, the data is registered in a hierarchical structure for each manufacturing step of an integrated circuit, for each semiconductor wafer consisting of a plurality of dies, and for each lot consisting of a plurality of semiconductor wafers.

Data input means 12 corresponds to a function to recognize input data through keyboard 110 or the like by CPU 101 which operates in accordance with the control programs held in RAM 104 or the like, and receives type selecting data for selecting a specified defect which is a defect of one type.

Data retrieving means 13 corresponds to a predetermined function of CPU 101 in accordance with the control programs held in RAM 104 or the like, and retrieves the die research data corresponding to the specified defect from data storing means 11 with the type selecting data input to data input means 12.

The following various means correspond to predetermined functions of CPU 101 in accordance with the control programs held in RAM 104 or the like. Specifically, data classifying means 14 classifies the die research data retrieved by data retrieving means 13 based on the number of the specified defects present on a die as shown in FIG. 4, and killer ratio calculating means 15 calculates a killer ratio $KR_1'$ from a plurality of groups of die research data classified by data classifying means 14.

More specifically, killer ratio calculating means 15 comprises first calculating means 21, second calculating means 22, third calculating means 23, data extracting means 24, correction generating means 25, and result correcting means 26. First calculating means 21 calculates a killer ratio for each of the groups of die research data classified by data classifying means 14.

Second calculating means 22 calculates, for each of the groups, a killer ratio in the case of one specified defect from the killer ratio for each of the groups calculated by first calculating means 21. Third calculating means 23 calculates one killer ratio as the average value of the killer ratios for the respective groups calculated by second calculating means 22.

It should be noted that third calculating means 23 is set to weight the killer ratios for the respective groups in accordance with the number of the specified defects when it calculates the one killer ratio as the average value. This weighting is performed in accordance with the ratio of the total number of the specified defects present on a single semiconductor wafer to the total number of the specified defects for each of groups such that a killer ratio in a group with a larger number of the specified defects is assigned a heavier weight.

Data extracting means 24 extracts dies with no specified defect from the die research data retrieved by data retrieving means 13. Correction generating means 25 generates corrected data which reflects the effects of types of defects other than the specified defect from the die research data extracted by data extracting means 24.

Result correction means 26 corrects the killer ratio calculated by third calculating means 23 with the corrected data generated by correction generating means 25, thereby generating the finally resultant killer ratio $KR_1'$ as data which is output by display 112.

Since killer ratio calculating means 15 comprising the aforementioned various means 21 to 26 corresponds to processing operations of CPU 101 as described above, stepwise processing operations with the aforementioned various means 21 to 26 are actually set to be completed in one operational processing.

Specifically, killer ratio calculating means 15 detects, from the die research data classified by data classifying means 14, the total number of dies T present in a semiconductor wafer, the number of dies T' with the specified defect, the number of dies $T_G$ with a favorable manufacturing result, the number of dies $T_G'$ with the specified defect and a favorable manufacturing result, the number of dies $T_i$ with i specified defects, the number of dies $T_{Gi}$ with i specified defects and a favorable manufacturing result, and the total number of specified defects N' present in the semiconductor wafer, and calculates the killer ratio $KR_1'$ resulting from the specified defect as follows:

$$KR_1'=\Sigma(T_i i/N')\{1-[(T_{Gi}(T-T'))/(T_i(T_G-T_G'))]^{1/i}\}$$

While the aforementioned various means are realized by utilizing hardware such as keyboard 110 or display 112 as required, its main portion is realized by the operation of CPU 101, which is hardware of a computer, in accordance with the software stored in the information storage medium such as RAM 104.

Such software is stored in the information storage medium such as RAM 104 as control programs for causing CPU 101 or the like to execute processing operations, for example, registering die research data received from an input device such as keyboard 110 in an information storage medium such as HDD 105 in a predetermined form to construct a database, receiving the input of type selecting data through an input device such as keyboard 110, retrieving the die research data from HDD 105 or the like with the received type selecting data, classifying the retrieved die research data based on the number of specified defects present on a die, detecting, from the classified die research data, the total number of dies T present in a semiconductor wafer, the number of dies T' with the specified defect, the number of dies $T_G$ with a favorable manufacturing result, the number of dies $T_G'$ with the specified defect and a favorable manufacturing result, the number of dies $T_i$ with i specified defects, the number of dies $T_{Gi}$ with i specified defects and a favorable manufacturing result, and the total number of specified defects N' present in the semiconductor wafer, and calculating, from the detection result, a killer ratio $KR_1'$ resulting from the specified defect as $KR_1'=\Sigma(T_i \cdot i/N')\{1-[(T_{Gi}(T-T'))/(T_i(T_G-T_G'))]^{1/i}\}$.

With the configuration as described above, a data processing method using data processing apparatus 100 of the embodiment will be hereinafter described. First, a user of data processing apparatus 100 uses a circuit manufacturing system (not shown) to sequentially form integrated circuits of the same structure on a number of dies of a semiconductor wafer through a plurality of manufacturing steps.

A defect checking apparatus (not shown) is used for each manufacturing step to check the number of defects for each type in each of a number of dies of the single semiconductor wafer. Additionally, final tests of completed IC chips are performed with the defect checking apparatus to determine satisfactory items. Then, die research data including at least the number of defects for each type and manufacturing result pass/fail is registered for each of a plurality of dies divided from the single semiconductor wafer in HDD 105 or the like of data processing apparatus 100.

In a state where the die research data is registered in data processing apparatus 100 as mentioned above, when a user attempts to know a killer ratio resulting from a defect of a specific type, as shown in FIG. 5, the user inputs type selecting data for selecting a specified defect which is a defect of one type to data processing apparatus 100 with keyboard 110 or the like (step S1).

Then, data processing apparatus 100 retrieves the die research data corresponding to the specified defect from HDD 105 or the like with the input type selecting data (step S2), and classifies the retrieved die research data based on the number of the specified defects present on a die (step S3).

Next, from the retrieved and classified die research data, data processing apparatus 100 detects the total number of dies T present in a semiconductor wafer, the number of dies T' with the specified defect, the number of dies $T_G$ with a favorable manufacturing result, the number of dies $T_G'$ with the specified defect and a favorable manufacturing result, the number of dies $T_i$ with i specified defects, the number of dies $T_{Gi}$ with i specified defects and a favorable manufacturing result, and the total number of specified defects N' present in the semiconductor wafer (step S4).

After the data detection is completed, a killer ratio $KR_1'$ resulting from the specified defect is calculated (step S5) as follows:

$$KR_1'=\Sigma(T_i \cdot i/N')\{1-[(T_{Gi}(T-T'))/(T_i(T_G-T_G'))]^{1/i}\}$$

and the killer ratio is outputted and displayed by display 112 to allow the user to visually recognize it (step S6).

Since the killer ratio $KR_1'$ provided to the user in this manner is so calculated as to reflect the effect of the number of the specified defects present on a single die, data processing apparatus 100 of the embodiment can calculate the killer ratio with satisfactory accuracy even when a plurality of specified defects are present on a single die.

Specifically, the killer ratios for the groups classified based on the number of the specified defects are weighted in accordance with the ratio of the total number of the specified defects present on the single semiconductor wafer to the total number of the specified defects for each of the groups such that a group with a larger number of the specified defects is assigned a heavier weight, before the calculation of one killer ratio as the average value.

Thus, data processing apparatus 100 of the embodiment can exactly reflect the effect of the number of the specified defects present on a single die in the calculation result of the killer ratio to calculate the killer ratio with exceedingly satisfactory accuracy when a plurality of specified defects are present on a single die.

Additionally, data processing apparatus 100 of the embodiment corrects the killer ratio in consideration of the effects of types of defects other than the specified defect by applying an approach as in the prior art to eliminate the effects of the types of defects other from the killer ratio which reflects the effect of the number of the specified defects present in a die, thereby making it possible to calculate the killer ratio with more satisfactory accuracy.

Next, the calculation method of the killer ratio $KR_1'$ with data processing apparatus 100 of the embodiment will be verified. First, a probability $KR_i$ of a defective manufacturing result of a die with i specified defects is defined, from the number of dies $T_i$ with i specified defects and the number of dies $T_{Gi}$ with i specified defects and a favorable manufacturing result, as follows:

$$KR_i=1-(T_{Gi}/T_i) \qquad (4)$$

which corresponds to the calculation result of fist calculating means 21.

Since the survival rate which is the probability of a favorable manufacturing result of a die with i specified defects is "$1-KR_i$," it is assumed that the survival rate in the case of one specified defect present on that die is "$1-KR_i$" to the "1/i"th power. Thus, the killer ratio $KR_{1i}$, which is the probability of a defective manufacturing result when the number of specified defects i present on a die is one, is given by:

$$KR_{1i}=1-(1-KR_i)^{1/i} \qquad (5)$$

which corresponds to the calculation result of second calculating means 22.

Since the killer ratio $KR_{1i}$ for one specified defect calculated as described above is calculated for each of the groups classified based on the number of the specified defects present on a die, the killer ratios $KR_{1i}$ for the respective groups must be integrated into one. In this case, it is possible to simply calculate the average value of the plurality of killer ratios $KR_{1i}$, but in the data processing method with data processing apparatus 100 of the embodiment, the killer ratios $KR_{1i}$ for the groups are individually weighted to improve the calculation accuracy.

It is determined that the killer ratio $KR_{1i}$ has more satisfactory accuracy as a larger number of the specified defects are present on a die, and a killer ratio $KR_{1i}$ for a larger number of the specified defects is weighted more heavily. Therefore, an weighting coefficient $P_i'$ of a killer ratio $KR_{1i}$ for i specified defect is defined, with the total number of the specified defects N' present on a semiconductor wafer, as follows:

$$P_i'=T_i \cdot i/N' \qquad (6)$$

The killer ratio KR' resulting from the specified defect is, from the aforementioned equations (5) and (6), given by:

$$KR'=\Sigma(T_i \cdot i/N')\{1-[T_{Gi}/T_i]^{1/i}\} \qquad (7)$$

which corresponds to the calculation result of third calculating means 23. The killer ratio KR' calculated in this manner has satisfactory accuracy since it reflects the effect of the number of the specified defects present on a single die.

Since the aforementioned killer ratio KR' does not consider the effects of kinds of defects other than the specified defect, the data processing method with data processing apparatus 100 of the embodiment corrects the aforementioned killer ratio KR' into one which considers the effects of other kinds of defects as a final result.

The correction employs a conventional approach, and when the two parameters "$T_G'$", "T" in the equation (3) described in the prior art are replaced with "$T_{Gi}'$, $T_i$", a probability $KR_i$ of a defective manufacturing result of a die with i specified defects and another kind of defect is given by:

$$KR_i = 1 - [(T_{Gi}(T-T))/(T_i(T_G - T_G'))]^{1/i} \quad (8)$$

which corresponds to the corrected data from correction generating means 25.

When the aforementioned equation (8) is applied into the equation (7), the killer ratio $KR_1'$ is given by:

$$KR_1' = \Sigma(T_i \cdot i/N') \times \{1 - [(T_{Gi}(T-T))/(T_i(T_G - T_G'))]^{1/i}\} \quad (9)$$

This killer ratio $KR_1'$ corresponds to the output result of result correcting means 26 which is the final result of data processing apparatus 100 of the embodiment. Since the killer ratio $KR_1'$ reflects the number of the specified defects present on a single die and reflects the effect of the presence of other kinds of defects, the accuracy thereof is exceedingly satisfactory.

It should be noted that data processing apparatus 100 of the embodiment utilizes the killer ratio $KR_1'$ calculated as described above to calculate the number of the specified defects $N_F'$ which cause defective IC chips, the number of IC chips $T_F$ which represent a defective manufacturing result due to the specified defect, an upper limit value of the yield of IC chips LY resulting from the effect of the specified defect, and an upper limit value of the yield of IC chips $LY_{a11}$ resulting from all kinds of defects.

In this case, the number of the specified defects $N_F'$ which cause defective IC chips is calculated from the aforementioned equation (9) as follows:

$$N_F' = N' \cdot KR_1' \quad (10)$$

When the killer ratio $KR_{1i}$ in the aforementioned equation (5) is replaced with the killer ratio $KR_1'$ in the equation (9) for modification, the following is given:

$$KR_i = 1 - (1 - KR_1')^i \quad (11)$$

Thus, the number of IC chips $T_F$ which represent a defective manufacturing result due to the specified defect is calculated by:

$$T_F = \Sigma T_i[1 - (1 - KR_1')^i] \quad (12)$$

Additionally, the upper limit value of the yield LY resulting from the effect of the specified defect is calculated from the aforementioned equation (12) as follows:

$$LY = (T - T_F)/T = 1 - (T_F/T) \quad (13)$$

The upper limit value of the yield of IC chips $LY_{a11}$ resulting from all kinds of defects is calculated from an upper limit value of the yield $LY_k$ resulting from specified defects of kind k as follows:

$$LY_{a11} = \Pi LY_k \quad (14)$$

The inventors formed a prototype of data processing apparatus 100 and researched the calculation accuracy of the killer ratio $KR_{1i}$ with model data of die research data. The model data was obtained from a single semiconductor wafer divided into 100 dies on which 100 specified defects and 30 critical defects of other kinds were randomly disposed.

In the model data created in this manner, approximately 40% of dies had two or more defects, the killer ratio resulting from the specified defect was 0.4, and 40 critical specified defects existed. Then, from the model data, the killer ratio and the like were calculated with the conventional method and with the data processing method of data processing apparatus 100 of the embodiment, and the results shown in FIG. 6 ware obtained.

Figure 6:
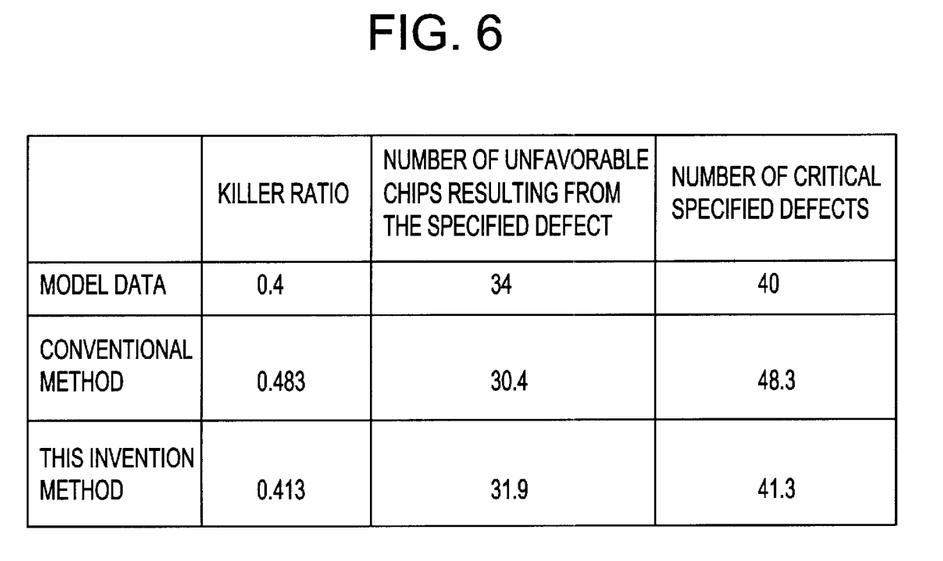
FIG. 6 is a table showing results of the calculation of a killer ratio and the like from model data using a prior art and the data processing method with the data processing apparatus of the embodiment.

In the conventional method shown in FIG. 6, the effects of other kinds of defects were corrected. As apparent from FIG. 6, the data processing method with data processing apparatus 100 of the embodiment can calculate the killer ratio and the like with more satisfactory accuracy as compared with the conventional method.

With the calculation of the killer ratio resulting from the specified defect as described above, when the specified defect is detected from another semiconductor wafer, the yield of IC chips manufactured from the semiconductor wafer can be predicted based on the number of the specified defects. Thus, as shown in FIG. 7, the inventors also researched the prediction accuracy of the yield of IC chips with data processing apparatus 100 of the embodiment.

Model data therefor was obtained from a single semiconductor wafer having 100 dies on which 20 specified defects as described above and 30 critical defects of other kinds were randomly disposed. In the model data, approximately 5% of dies had two or more defects and 8 critical specified defects existed.

Figure 7:
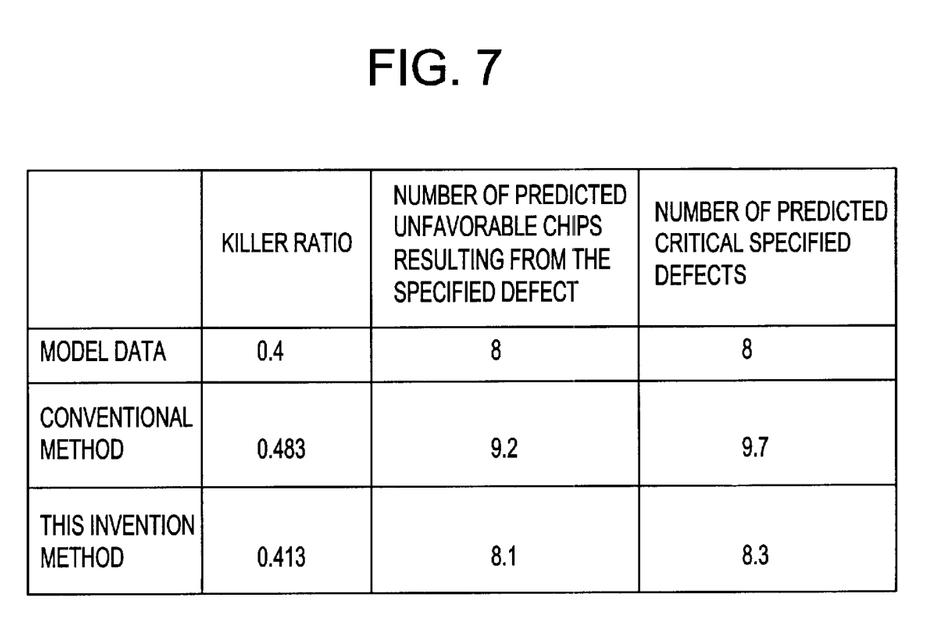
FIG. 7 is a table showing prediction accuracy of the yields of IC chips with the data processing apparatus of the embodiment.

As apparent from FIG. 7, it is verified that data processing apparatus 100 of the embodiment can also predict the yield of IC chips under the effects of the specified defects with more satisfactory accuracy as compared with the conventional method.

It should be noted that the present invention is not limited to the aforementioned embodiment, and various modifications are allowed without departing from its scope. For example, the aforementioned embodiment illustrates the die research data collected from a single semiconductor wafer in a single manufacturing step for simplifying the description.

However, such die research data is collected in various forms as desired. Typically, the data is collected and registered for a plurality of manufacturing steps in a single semiconductor wafer, for each lot consisting of a plurality of semiconductor wafers, for a plurality of lots, and for each type of manufactured IC chips.

Therefore, when the die research data is registered corresponding to all of the aforementioned conditions, a user may designate a type of manufactured IC chips, a desired lot, a desired semiconductor wafer in the lot, and a desired manufacturing step in the semiconductor wafer, and then designate a specified defect.

While the aforementioned embodiment illustrates one specified defect as the unit for classifying the die research data into a plurality of groups, the die research data may be classified into a plurality of groups based on a predetermined number of specified defects as the unit, for example, 0, 1 to 10, and 11 to 20.

Additionally, while the aforementioned embodiment illustrates that whether IC chips finally manufactured from dies pass or fail is registered as manufacturing result pass/fail, the manufacturing result may be any which corresponds to manufacturing steps, and for example, it is possible to determine manufacturing result pass/fail for each manufacturing step to register the results as data.

Furthermore, the aforementioned embodiment illustrates that the killer ratio $KR_1'$ which reflects the effect of the number of the specified defects present on a single die and reflects the effect of the presence of other kinds of defects is calculated as follows:

$$KR_1' = \Sigma(T_i \cdot i/N')\{1-[(T_{Gi}(T-T'))/(T_i(T_G-T_G'))]^{1/i}\}$$

However, the killer ratio KR' which does not consider the effect of the presence of other kinds of defects may be calculated as follows:

$$KR' = \Sigma(T_i \cdot i/N')\{1-[T_{Gi}/T_i]^{1/i}\}$$

which is provided to a user. Similarly, the killer ratio $KR_i$ which is the probability of a defective manufacturing result of a die with i specified defects may be calculated as follows:

$$KR_i = 1-(T_{Gi}/T_i)$$

and may be provided to a user. The killer ratio $KR_{1i}$ which is the probability of a defective manufacturing result of a die with the number of specified defect i being one may be calculated as follows:

$$KR_{1i} = 1-(1-KR_i)^{1/i}$$

and may be provided to a user.

In addition, the aforementioned embodiment illustrates that CPU 101 operates in accordance with the control programs stored in RAM 104 or the like as software, thereby logically realizing various means of data processing apparatus 100 as various functions. However, each of such various means may be formed as inherent hardware. Alternatively, some of which may be stored in RAM 104 or the like as software and others may be formed as hardware.

The aforementioned embodiment assumes that the software previously installed from CD-ROM 108 or the like to HDD 105 is copied to RAM 104 at the start-up of data processing apparatus 100 and the software thus stored in RAM 104 is read by CPU 101. However, such software stored in HDD 105 may be utilized by CPU 101 without copying, or such software may be fixedly stored in ROM 103 in advance.

The software may be stored in FD 106 or CD-ROM 108, which are information storage media treatable as standalone product, and then installed from FD 106 or the like to HDD 105 or RAM 104. However, the software may be directly read by CPU 101 from FD 106 or the like without such installation for performing processing operations.

In other words, when various means of data processing apparatus 100 of the present invention are realized by software, the software may be any which is read by CPU 101 to perform corresponding operations. It is also possible to form the control programs for realizing the aforementioned various means as a combination of a plurality of software, in which case only minimum software required for realizing data processing apparatus 100 of the present invention may be stored in an information storage medium which is a standalone product.

For example, when data processing apparatus 100 having an existing operating system implemented thereon is provided with application software by means of an information storage medium such as CD-ROM 108, the software for realizing various means of data processing apparatus 100 of the present invention is realized by a combination of the application software and the operating system. This enables the elimination of some of the software dependent on the operating system from the application software of the information storage medium.

The approach of supplying CPU 101 with the software described in the information storage medium in this manner is not limited to the direct loading of the information storage medium into data processing apparatus 100. For example, it is possible that software as mentioned above is stored in an information storage medium of a host computer which is connected to a terminal computer through a communication network such that the software is provided from the host computer to the terminal computer through data communication.

In the aforementioned case, while the terminal computer may perform standalone processing operations in a state where the software is downloaded into its own information storage medium, the terminal computer may perform processing operations with real time data communication to and from the host computer without downloading the software. In this case, the entire system which connects the host computer and the terminal computer through the communication network corresponds to the data processing apparatus of the present invention.

The present invention is configured as described above and has effects as follows.

In the data processing method according to a first aspect of the data processing apparatus of the present invention, the die research data including at least the number of defects for each type and manufacturing result pass/fail for each of a plurality of dies divided from a single wafer is previously registered in the data storing means. When the type selecting data for selecting a specified defect which is a defect of one type is input to the data input means, the die research data corresponding to the specified defect is retrieved by the data retrieving means from the data storing means with the input type selecting data. The retrieved die research data is classified by the data classifying means based on the number of the specified defects present on a die, and the killer ratio is calculated by the first calculating means for each of a plurality of groups of the classified die research data. Therefore, the killer ratio can be calculated for each of the groups classified based on the number of the specified defects present on a die.

In the data processing apparatus as described above, the second calculating means calculates a killer ratio in the case of one specified defect for each of the groups from the killer ratio for each of the groups calculated by the first calculating means, thereby making it possible to calculate a killer ratio when a plurality of the specified defects present on a die is assumed to be one.

Additionally, when the third calculating means calculates one killer ratio as the average value of the killer ratios for the respective groups calculated by the second calculating means, one killer ratio which reflects the effect of the number of the specified defects present on a die can be calculated to achieve the calculation of the killer ratio with more satisfactory accuracy than in the prior art.

The third calculating means weights the killer ratio for each of the groups in accordance with the number of the specified defects, thereby allowing the effect of the number of the specified defects present on a die to be appropriately reflected in the calculation result of the killer ratio, resulting in more satisfactory accuracy of the calculation of the killer ratio.

When the third calculating means assigns a heavier weight to a killer ratio in a group with a larger number of the specified defects, the effect of the number of the specified defects present on a die can be more appropriately reflected in the calculation result of the killer ratio, thereby making it possible to further improve the calculation accuracy of the killer ratio.

When the third calculating means weights the killer ratio in accordance with the ratio of the total number of the specified defects present on a single wafer to the total number of the specified defects for each of the groups, the effect of the number of the specified defects present on a die can be more appropriately reflected in the calculation result of the killer ratio, realizing more satisfactory accuracy of the calculation of the killer ratio.

Furthermore, the data extracting means extracts dies with no specified defect from the die research data retrieved by the data retrieving means, the correction generating means generates corrected data which reflects the effects of types of defects other than the specified defect from the extracted die research data, and result correcting means corrects the killer ratio with the generated corrected data, thereby making it possible to eliminate the effects of kinds of defects other than the specified defect from the killer ratio which reflects the effect of the number of the specified defects present on a die, achieving more improved calculation accuracy of the killer ratio.

In the data processing method according to a second aspect of the data processing apparatus of the present invention, the die research data including at least the number of defects for each type and manufacturing result pass/fail for each of a plurality of dies divided from a single wafer is previously registered in the data storing means. When the type selecting data for selecting a specified defect which is a defect of one type is input to the data input means, the die research data corresponding to the specified defect is retrieved by the data retrieving means from the data storing means with the input type selecting data. From the retrieved die research data, the killer ratio calculating means detects the number of dies $T_i$ with i specified defects, the number of dies $T_{Gi}$ with i specified defects and a favorable manufacturing result, and the total number of specified defects N' present in the wafer, and calculates a killer ratio KR' resulting from the specified defect as $KR'=\Sigma(T_i \cdot i/N')\{1-[T_{Gi}/T_i]^{1/i}\}$. Therefore, one killer ratio which reflects the effect of the number of the specified defects present on a die can be calculated to achieve the calculation of the killer ratio with more satisfactory accuracy than in the prior art.

In the data processing method according to a third aspect of the data processing apparatus of the present invention, the die research data including at least the number of defects for each type and manufacturing result pass/fail for each of a plurality of dies divided from a single wafer is previously registered in the data storing means. When the type selecting data for selecting a specified defect which is a defect of one type is input to the data input means, the die research data corresponding to the specified defect is retrieved by the data retrieving means from the data storing means with the input type selecting data. From the retrieved die research data, the killer ratio calculating means detects the total number of dies T present in the wafer, the number of dies T' with the specified defect, the number of dies $T_G$ with a favorable manufacturing result, the number of dies $T_G'$ with the specified defect present and a favorable manufacturing result, the number of dies $T_i$ with i specified defects, the number of dies $T_{Gi}$ with i specified defects and a favorable manufacturing result, and the total number of specified defects N' present in the wafer, and calculates a killer ratio $KR_1'$ resulting from the specified defect as $KR_1'=\Sigma(T_i \cdot i/N')\{1-[(T_{Gi}(T-T'))/(T_i(T_G-T_G'))]^{1/i}\}$. Therefore, a killer ratio which reflects the effect of the number of the specified defects present on a die and which eliminates the effects of kinds of defects other than the specified defect can be calculated to achieve the calculation of the killer ratio with more satisfactory accuracy than in the prior art.

When the programs stored in the information storage medium according to a first aspect of the present invention are read by a computer to perform corresponding processing operations, the computer stores die research data including at least the number of defects for each type and manufacturing result pass/fail for each of a plurality of dies divided from a single wafer, and, in this state, receives the input of type selecting data for selecting a specified defect which is a defect of one type. The computer retrieves the die research data corresponding to the specified defect from with the input type selecting data, and classifies the retrieved die research data based on the number of the specified defects present on a die. The computer then calculates a killer ratio for each of a plurality of groups of the classified die research data, and calculates, from the calculated killer ratio for each of the groups, a killer ratio in the case of one specified defect for each of the groups. The computer weights the killer ratio calculated for each of the groups in accordance with the number of the specified defects, and calculates one killer ratio the average value of the weighted killer ratios for the respective groups, thereby calculating one killer ratio which reflects the effect of the number of the specified defects present on a die, making it possible to calculate the killer ratio with more satisfactory accuracy than in the prior art.

When the programs stored in the information storage medium according to a second aspect of the present invention are read by a computer to perform corresponding processing operations, the computer stores die research data including at least the number of defects for each type and manufacturing result pass/fail for each of a plurality of dies divided from a single wafer, and, in this state, receives the input of type selecting data for selecting a specified defect which is a defect of one type. The computer retrieves die research data corresponding to the specified defect from with the input type selecting data, and classifies the retrieved die research data based on the number of the specified defects present on a die. The computer then detects, from the classified die research data, the number of dies $T_i$ with i specified defects, the number of dies $T_{Gi}$ with i specified defects and a favorable manufacturing result, and the total number of specified defects N' present in the wafer, and calculates a killer ratio KR' resulting from the specified defect as $KR'=\Sigma(T_i \cdot i/N')\{1-[T_{Gi}/T_i]^{1/i}\}$, thereby making it possible to calculate one killer ratio which reflects the effect of the number of the specified defects present on a die, achieving the calculation of the killer ratio with more satisfactory accuracy than in the prior art.

When the programs stored in the information storage medium according to a third aspect of the present invention are read by a computer to perform corresponding processing operations, the computer stores die research data including at least the number of defects for each type and manufacturing result pass/fail for each of a plurality of dies divided from a single wafer, and, in this state, receives the input of type selecting data for selecting a specified defect which is a defect of one type. The computer retrieves die research data corresponding to the specified defect from with the input type selecting data, and classifies the retrieved die research data based on the number of the specified defects present on a die. The computer then detects, from the classified die research data, the total number of dies T present in the wafer, the number of dies T' with the specified defect, the number of dies $T_G$ with a favorable manufacturing result, the number of dies $T_G'$ with the specified defect and a favorable manufacturing result, the number of dies $T_i$ with i specified defects, the number of dies $T_{Gi}$ with i specified defects and a favorable manufacturing result, and the total number of specified defects N' present in the wafer, and calculates a killer ratio $KR_1'$ resulting from the specified defect as $KR_1'=\Sigma(T_i\cdot i/N')\{1-[(T_{Gi}(T-T'))/(T_i(T_G-T_G'))]^{1/i}\}$, thereby making it possible to calculate a killer ratio which reflects the effect of the number of the specified defects present on a die and which eliminates the effects of kinds of defects other than the specified defect, achieving the calculation of the killer ratio with more satisfactory accuracy than in the prior art.

What is claimed is:

1. A method of processing data comprising the steps of:
previously registering die research data including at least a number of defects for each type and manufacturing result pass/fail for each of a plurality of dies divided from a single wafer;
receiving type selecting data for selecting a specified defect which is a defect of one type;
retrieving the die research data corresponding to the specified defect with the input type selecting data;
classifying the retrieved die research data based on a number of the specified defects present on a die;
calculating a killer ratio for each of a plurality of groups of the classified die research data;
calculating a killer ratio in a case of one specified defect for each of the groups from the calculated killer ratio for each of the groups;
weighting the calculated killer ratio for each of the groups in accordance with the number of the specified defects; and
calculating one killer ratio as an average value of the weighted killer ratios for the respective groups.

2. A method of processing data comprising the steps of:
previously registering die research data including at least a number of defects for each type and manufacturing result pass/fail for each of a plurality of dies divided from a single wafer;
receiving type selecting data for selecting a specified defect which is a defect of one type;
retrieving the die research data corresponding to the specified defect with the input type selecting data;
classifying the retrieved die research data based on a number of the specified defects present on a die;
detecting, from the classified die research data, a number of dies $T_i$ with i specified defects, a number of dies $T_{Gi}$ with i specified defects and a favorable manufacturing result, and a total number of specified defects N' present in the wafer; and
calculating a killer ratio KR' resulting from the specified defect as follows;

$$KR'=\Sigma(T_i\cdot i/N')\{1-[T_{Gi}/T_i]^{1/i}\}.$$

3. A method of processing data comprising the steps of:
previously registering die research data including at least a number of defects for each type and manufacturing result pass/fail for each of a plurality of dies divided from a single wafer;
receiving type selecting data for selecting a specified defect which is a defect of one type;
retrieving the die research data corresponding to the specified defect with the input type selecting data;
classifying the retrieved die research data based on a number of the specified defects present on a die;
detecting, from the classified die research data, a total number of dies T present in the wafer, a number of dies T' with the specified defect, the number of dies $T_G$ with a favorable manufacturing result, a number of dies $T_G'$ with the specified defect and a favorable manufacturing result, a number of dies $T_i$ with i specified defects, a number of dies $T_{Gi}$ with i specified defects and a favorable manufacturing result, and a total number of specified defects N' present in the wafer; and
calculating a killer ratio $KR_1'$ resulting from the specified defect as follows:

$$KR_1'=\Sigma(T_i\cdot i/N')\{1-[(T_{Gi}(T-T'))/(T_i(T_G-T_G'))]^{1/i}\}.$$

4. A data processing apparatus comprising:
data storing means for previously registering die research data including at least a number of defects for each type and manufacturing result pass/fail for each of a plurality of dies divided from a single wafer;
data input means for receiving type selecting data for selecting a specified defect which is a defect of one type;
data retrieving means for retrieving the die research data corresponding to the specified defect from said data storing means with the type selecting data input to said data input means;
data classifying means for classifying the die research data retrieved by said data retrieving means based on a number of the specified defects present on a die; and
first calculating means for calculating a killer ratio for each of a plurality of groups of the die research data classified by said data classifying means.

5. The data processing apparatus according to claim 4, further comprising second calculating means for calculating a killer ratio in a case of one specified defect for each of the groups from the killer ratio for each of the groups calculated by said first calculating means.

6. The data processing apparatus according to claim 5, further comprising third calculating means for
calculating one killer ratio as an average value of the killer ratios for the respective groups calculated by said second calculating means.

7. The data processing apparatus according to claim 6, wherein said third calculating means weights the killer ratio for each of the groups in accordance with the number of the specified defects when it calculates one killer ratio as the average value.

8. The data processing apparatus according to claim 7, wherein said third calculating means assigns a heavier weight to the killer ratio in a group with a larger number of the specified defects.

9. The data processing apparatus according to claim 8, wherein said third calculating means weights the killer ratio in accordance with a ratio of a total number of the specified defects present on a single wafer to a total number of the specified defects for each of the groups.

10. The data processing apparatus according to claim 4, further comprising:
data extracting means for extracting dies with no specified defect from the die research data retrieved by said data retrieving means;
correction generating means for generating corrected data which reflect effects of types of defects other than the specified defect from the die research data extracted by said data extracting means; and
result correction means for correcting the killer ratio with the corrected data generated by said correction generating means.

11. The data processing apparatus according to claim 5, further comprising:

data extracting means for extracting dies with no specified defect from the die research data retrieved by said data retrieving means;

correction generating means for generating corrected data which reflect effects of types of defects other than the specified defect from the die research data extracted by said data extracting means; and result correction means for correcting the killer ratio with the corrected data generated by said correction generating means.

12. The data processing apparatus according to claim 6, further comprising:

data extracting means for extracting dies with no specified defect from the die research data retrieved by said data retrieving means;

correction generating means for generating corrected data which reflect effects of types of defects other than the specified defect from the die research data extracted by said data extracting means; and result correction means for correcting the killer ratio with the corrected data generated by said correction generating means.

13. The data processing apparatus according to claim 7, further comprising:

data extracting means for extracting dies with no specified defect from the die research data retrieved by said data retrieving means;

correction generating means for generating corrected data which reflect effects of types of defects other than the specified defect from the die research data extracted by said data extracting means; and result correction means for correcting the killer ratio with the corrected data generated by said correction generating means.

14. The data processing apparatus according to claim 8, further comprising:

data extracting means for extracting dies with no specified defect from the die research data retrieved by said data retrieving means;

correction generating means for generating corrected data which reflect effects of types of defects other than the specified defect from the die research data extracted by said data extracting means; and result correction means for correcting the killer ratio with the corrected data generated by said correction generating means.

15. The data processing apparatus according to claim 9, further comprising:

data extracting means for extracting dies with no specified defect from the die research data retrieved by said data retrieving means;

correction generating means for generating corrected data which reflect effects of types of defects other than the specified defect from the die research data extracted by said data extracting means; and result correction means for correcting the killer ratio with the corrected data generated by said correction generating means.

16. A data processing apparatus comprising:

data storing means for previously registering die research data including at least a number of defects for each type and manufacturing result pass/fail for each of a plurality of dies divided from a single wafer;

data input means for receiving type selecting data for selecting a specified defect which is a defect of one type;

data retrieving means for retrieving the die research data corresponding to the specified defect from said data storing means with the type selecting data input to said data input means;

data classifying means for classifying the die research data retrieved by said data retrieving means based on a number of the specified defects present on a die; and killer ratio calculating means for detecting, from a plurality of groups of the die research data classified by said data classifying means, a number of dies $T_i$ with i specified defects, a number of dies $T_{Gi}$ with i specified defects and a favorable manufacturing result, and a total number of specified defects N' present in the wafer and calculating a killer ratio KR' resulting from the specified defect as follows;

$$KR' = \Sigma(T_i \cdot i/N')\{1-[T_{Gi}/T_i]^{1/i}\}.$$

17. A data processing apparatus comprising:

data storing means for previously registering die research data including at least a number of defects for each type and manufacturing result pass/fail for each of a plurality of dies divided from a single wafer;

data input means for receiving type selecting data for selecting a specified defect which is a defect of one type;

data retrieving means for retrieving the die research data corresponding to the specified defect from said data storing means with the type selecting data input to said data input means;

data classifying means for classifying the die research data retrieved by said data retrieving means based on a number of the specified defects present on a die; and killer ratio calculating means for detecting, from a plurality of groups of the die research data classified by said data classifying means, a total number of dies T present in the wafer, a number of dies T' with the specified defect, a number of dies $T_G$ with a favorable manufacturing result, a number of dies $T_G'$ with the specified defect and a favorable manufacturing result, a number of dies $T_i$ with i specified defects, a number of dies $T_{Gi}$ with i specified defects and a favorable manufacturing result, and a total number of specified defects N' present in the wafer, and calculating a killer ratio $KR_1'$ resulting from the specified defect as follows:

$$KR_1' = \Sigma(T_i \cdot i/N')\{1-[(T_{Gi}(T-T'))/(T_i(T_G-T_G'))]^{1/i}\}.$$

18. An information storage medium for storing software readable by a computer as programs which causes said computer to execute:

storing die research data including at least a number of defects for each type and manufacturing result pass/fail for each of a plurality of dies divided from a single wafer;

receiving type selecting data for selecting a specified defect which is a defect of one type;

retrieving the die research data corresponding to the specified defect with the input type selecting data;

classifying the retrieved die research data based on a number of the specified defects present on a die;

calculating a killer ratio for each of a plurality of groups of the classified die research data;

calculating a killer ratio in a case of one specified defect for each of the groups from the calculated killer ratio for each of the groups;

weighting the calculated killer ratio for each of the groups in accordance with the number of the specified defects; and calculating one killer ratio as an average value of the weighted killer ratios for the respective groups.

19. An information storage medium for storing software readable by a computer as programs which causes said computer to execute:

storing die research data including at least a number of defects for each type and manufacturing result pass/fail for each of a plurality of dies divided from a single wafer;

receiving type selecting data for selecting a specified defect which is a defect of one type;

retrieving the die research data corresponding to the specified defect with the input type selecting data;

classifying the retrieved die research data based on a number of the specified defects present on a die;

detecting, from the classified die research data, a number of dies $T_i$ with i specified defects, a number of dies $T_{Gi}$ with i specified defects and a favorable manufacturing result, and a total number of specified defects N' present in the wafer; and calculating a killer ratio KR' resulting from the specified defect as follows;

$$KR' = \Sigma(T_i \cdot i/N')\{1-[T_{Gi}T_i]^{1/i}\}.$$

20. An information storage medium for storing software readable by a computer as programs which causes said computer to execute:

storing die research data including at least a number of defects for each type and manufacturing result pass/fail for each of a plurality of dies divided from a single wafer;

receiving type selecting data for selecting a specified defect which is a defect of one type;

retrieving the die research data corresponding to the specified defect with the input type selecting data;

classifying the retrieved die research data based on a number of the specified defects present on a die;

detecting, from the classified die research data, a total number of dies T present in the wafer, a number of dies T' with the specified defect, a number of dies $T_G$ with a favorable manufacturing result, a number of dies $T_G'$ with the specified defect and a favorable manufacturing result, a number of dies $T_i$ with i specified defects, a number of dies $T_{Gi}$ with i specified defects and a favorable manufacturing result, and a total number of specified defects N' present in the wafer; and calculating a killer ratio $KR_1'$ resulting from the specified defect as follows:

$$KR_1' = \Sigma(T_i \cdot i/N')\{1-[(T_{Gi}(T-T'))/(T_i(T_G-T_G'))]^{1/i}\}.$$

* * * * *